June 6, 1944.  C. GLIUBICH  2,350,751
CONTROL MEANS FOR AIRCRAFT WING FLAPS
Filed Oct. 5, 1940
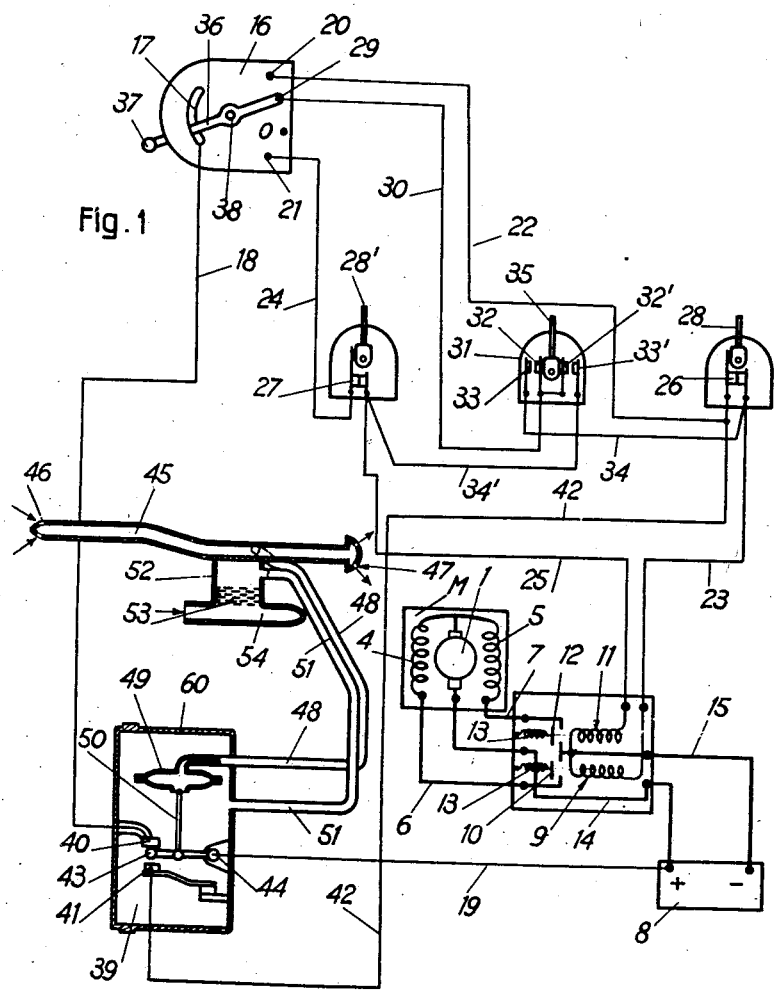
Fig. 1
Fig. 2
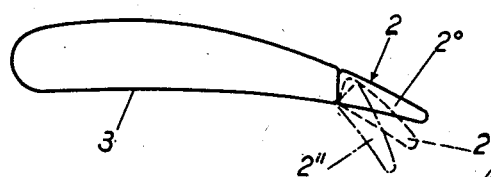
Inventor:
C. Gliubich Patented June 6, 1944

2,350,751

UNITED STATES PATENT OFFICE 2,350,751

CONTROL MEANS FOR AIRCRAFT WING FLAPS

Carlo Gliubich, Milan, Italy; vested in the Alien Property Custodian

Application October 5, 1940, Serial No. 359,941
In Italy October 10, 1939

5 Claims. (Cl. 244—78)

It is known that in aeroplanes and aircraft generally the wings are provided with wing flaps which are adjusted into different positions in accordance with conditions of landing, taking off and normal flight; it is known to use a servo-motor for the actuation of said wing flaps and particularly a reversible electric motor operative to adjust said wing flaps into their several required positions under the pilot control.

This invention has for its object a device for the control of the wing flaps of aircraft wings which is able to effect automatically the control and actuation of wing flaps when the aircraft has reached a predetermined speed and, more particularly, to adjust said wing flaps into their normal flight position from their taking off position on the aircraft reaching a predetermined speed.

In this invention the service motor or electromotor which actuates said wing flaps is subject to a control responsive to the aircraft speed and causing the servo-motor to operate as necessary to adjust said wing flaps into their normal flight position on the aircraft reaching a predetermined speed.

The speed responsive device may include a Pitot tube or a Venturi tube or a centrifugal governor operated by the flying or relative wind stream; the actuation of the wing flaps may be effected by means of an electromotor or a servo-motor of any appropriate class.

An embodiment of this invention is hereinafter described by way of example with reference to the annexed drawing in which:

Fig. 1 illustrates diagrammatically an arrangement in accordance with this invention with a Pitot tube control device and reversible electric motor actuating means;

Fig. 2 shows diagrammatically the section of a wing with a wing flap cooperating therewith, this wing flap being shown in full line, in dotted line and in chain line in the several positions in which it may be carried.

In the illustrated embodiment, 1 denotes the rotor of a reversible electric motor M intended to actuate the wing flap 2 of a wing 3 (Fig. 2) of an aircraft by means of a drive of any suitable class, not shown, which may include a drum actuated by said rotor 1 and ropes operated by said drum and actuating said flap 2 or a gear drive including worms, worm wheels and shafts; the motor M includes two field windings 4, 5 for its operation in reverse directions, said windings being adapted to be connected alternatively by means of conductors 6 and 15 or 7 and 15, with one terminal of a supply battery 8 by means of relays including coils 9, 11 and armatures 10, 12 which are urged by springs 13 into their open-circuit positions; the feeding circuit of the motor M is completed through the rotor 1 and a conductor 14 which leads to the opposite terminal of the battery 8.

The relay coils 9, 11 have one end connected in common with a conductor 15 and a terminal of the battery 8, and they are controlled by means of a controller 16 whose quadrant contact 17 is connected with the terminal of the battery 8 opposed to that from which the conductor 15 leads; this connection of the quadrant contact 17 with the respective terminal of the battery 8 is provided by means of conductors 18, 19 in which a switch denoted in its whole by 39 is inserted as hereinafter described.

The opposed ends of the coils 9, 11 are connected with contacts 20 and 21 of the controller 16 which correspond respectively to the positions of the wing flaps for normal flight and for landing (said positions being referenced 2° and 2" in Fig. 2) by means of leads 22, 23 and 24, 25 in which the end-stroke stop switches 26, 27 are inserted, respectively, these switches being usually cut-in and being adapted to be moved into cut-out position by the respective cam arms 28, 28' under the action of the actuating means for the wing flap 2 at the time it takes its normal flight position and its landing position, respectively.

The controller 16 includes a third contact 29 for the taking off position of the wing flap, said position being intermediate the normal flight position and the landing position and being shown at 2' in Fig. 2; said contact 29 is connected by the lead 30 with movable contacts 32, 32' of a double switch 31 whose stationary contacts 33, 33' are connected with the relay coils 9 and 11 by the leads 34, 23 and 34', 25, respectively.

A cam arm 35 operating the movable contacts 32, 32' of the switch 31 is actuated by the wing flap drive to open the contacts 32, 33 and 32', 33' at the time the wing flap 2 is in its taking off position while at the time said flap 2 passes from its normal flight position to its taking off position or vice-versa, said contacts 32', 33' are closed and said contacts 32, 33 are held open; the contacts 32, 33 are held closed and the contacts 32', 33' are held open during the passage of the flap 2 from its taking off position into its landing position and vice-versa.

The switches 26, 27 and 31 are the usual stroke end switches adapted to be opened when the respective actuating means have brought the flaps to the desired position. For the actuation of said switches there are shown diagrammatically the arms 28, 28', 35 which are connected with control cams (not shown) operative on switch contacts or with spindles carrying said cams, and said arms are actuated by a member of the transmission which is driven in revolution by the rotor 1 of the motor M.

It is only necessary that the angular position of the cam connected with each of the arms 28, 28' or 35 and the drive ratio between said arm actuating member and the shaft of the motor M be selected in such a manner that the arms 28, 28' or 35 and the respective contact control cam are swung off by said actuating member to develop the desired operation at the time the wing flaps have reached their respective end positions in which they are required to come at stop.

The quadrant contact 17 of the controller 16 is bridged selectively with any of the contacts 20, 21, 29 by means of a wiping contact 36 actuated by the operator by means of the handle 37 fast on the spindle 38 having in turn said contact 36 fast thereon; in the zero-position of said wiping contact 36 all the circuits are disconnected.

The device of this invention intended to cause the wing flap 2 to pass automatically from its taking off position to its normal flight position at the time the aircraft has reached a predetermined speed, includes the switch 39 having two stationary contacts 40, 41 which are connected respectively with the lead 18 leading to the quadrant contact 17 of the controller 16 and with the lead 42 connected with the lead 22 which connects the normal flight controller contact 20 with the movable contact of the stop switch 26 for normal flight; a movable contact 43 fulcrumed at 44 in the switch 39 is connected with the lead 19 which in turn is connected with the supply battery 8, and is actuated by a device responsive to the aircraft speed.

In the illustrated embodiment the aircraft speed responsive device includes a Pitot tube comprising a tube 45 pointing towards the flight direction and having orifices 46, 47 at its ends for the flow of air therethrough; the tube 45 is connected by means of a duct 48 with an expansible bellows 49 which controls the movable contact 43 of the double switch 39 by means of a rod 50. The bellows 49 is located within a sealed casing 60 which is connected by a duct 51 with a chamber 52 which in turn opens in a tube 54 pointing towards the flying wind or flight direction through an air flow damping labyrinth or air pervious partition 53.

The air pressure operative within the bellows 49 during the aircraft flight through the tube 45 and the duct 48, has a value corresponding with a total pressure being the sum of the static air pressure and of the flying speed generated dynamic pressure, while the air entering the chamber 60 through the tube 54, chamber 52 and duct 51 and operative in said chamber 60 after its full dynamic energy has been lost through the partition 53, generates a pressure which corresponds with the static air pressure. Consequently the action of the bellows 49 on the rod 50 and movable contact 43 depends upon the aircraft speed and said bellows by effect of its own resiliency keeps the contact 43 forced on the contact 40 until the pressure operative therein and consequently the aircraft speed are below a predetermined value. Whilst when the air pressure overcomes said value within the bellows 49 said bellows 49 expands to cause the contact 43 to release the contact 40 and to engage the contact 41.

As above suggested any other device responsive to the aircraft speed and adapted to control the movable contact 43 in a manner depending upon the aircraft speed may be used in lieu of the above described device.

In operation, at the time the wing flap 2 has been adjusted into its landing position 2'' from its normal flight position 2 and the contact 36 has been carried on to the contact 21, the circuit of the relay 11 is open at the stop switch 27 and the circuit of the relay 9 is closed as follows preparatory to the flap passage into its taking off position: contact 29, lead 30, contacts 32 and 33 in closed position, leads 34 and 23, relay 9, conductor 15, battery 8, lead 19, contacts 43 and 40 which are held interengaged by the bellows 49 wherein no dynamic pressure is operative in the assumed conditions, lead 18 and quadrant contact 17; on the wiping contact 36 being moved onto the contact 29 the relay 9 is energised which causes its armature contact 10 to close and consequently causes the battery 8 to supply the circuit 8, 14, 1, 4, 6, 10, 15 of the motor M which is thus made operative in a direction to cause the wing flap 2 to move from its landing position 2'' into its taking off position 2' (Fig. 2).

On the wing flap 2 reaching its taking off position 2' its drive operates the arm 35 of double switch 31 to separate contacts 32, 33; then the energisation of the relay 9 is cut out and the motor M comes to rest, while a circuit intended to energise the relay 9 to cause the further operation of the motor M in the same direction as that of the above described operation to adjust the wing flap 2 into its normal flight position 2⁰ is prepared as follows: 20, 22, 26 (closed), 23, 9, 15, 8, 19, 43, 40, 18, 17; accordingly the wing flap 2 may be caused to take its normal flight position from its taking off position by bringing the wiping contact 36 of the controller 16 onto the contact 20, thus causing the energisation of the relay 9 and closing the armature contact 10 of the motor supply circuit.

On the other hand, due to the described arrangement, the energisation of the relay 9 is also prepared by the circuit 8, 19, 43, 41, 42, 26 (closed), 23, 9, 15 this circuit standing open at the contacts 43, 41 until the bellows 49 causes the movable contact 43 to separate from the contact 40 and to engage the contact 41 as an effect of the dynamic pressure operative in said bellows 49 due to the speed the aircraft has reached.

Consequently, after the contact 36 of the controller 16 has been adjusted in flap taking off position, the wing flap 2 is caused to take its normal flight position 2⁰ automatically as soon as the aircraft has reached a speed at which the engagement of the contacts 43, 41 occurs under the action of the dynamic air pressure operative within the bellows 49; on the other hand the adjustment of said wing flap into its normal flight position 2⁰ may be caused in any case and at any time by an operator by bringing the contact 36 over the normal flight contact 20.

At the time the wing flap 2 moves from its taking off position 2' to take its normal flight position 2⁰, the contacts 32', 33' are closed and on said flap 2 reaching its normal flight position 2⁰ the cooperating stroke end switch 26 opens, to cut in any case the energisation of the relay 9 both when the circuit of this relay has been closed automatically at contacts 41, 43 and when said circuit has been closed under an operator's action bringing the contact 36 in engagement with the contact 20; the flap is accordingly held in its normal flight position.

In this position a circuit adapted to energise the relay 11 to supply current to the motor M to bring the wing flap 2 into its landing position 2″ is prepared as follows: 21, 24, 27 (closed), 25, 11, 15, 8, 19, 43, 40, 18, 17, 36 and it stands open until such time as the aircraft speed has dropped below the normal flight position. Of course a speed reduction occurs before the aircraft is put in conditions for landing; on such a speed drop occurring the bellows 49 moves the contact 43 into engagement with the contact 40 as an effect of the drop of the dynamic pressure within it, said bellows 49 and contacts 43, 40 thus preparing the circuit of the relay 11 which is energised at the time the operator brings the contact 36 on the landing contact 21; the armature contact 12 thus moves at this instant to set the circuit 8, 14, 1, 5, 7, 12, 15 in conditions to supply the motor M for its operation in such direction as necessary to adjust the wing flap 2 into its landing position 2″.

At the time the wing flap 2 reaches its landing position 2″ the switch 27 is brought into its circuit opening condition and the circuit of the relay 11 is cut out.

What I claim as my invention and desire to secure by United States Letters Patent is:

1. An arrangement for automatic control of a wing flap of an aircraft wing comprising means actuating said flap to bring it to either taking off position, normal flight position or landing position selectively from another of said positions, means for energizing said actuating means, hand actuated control means for said energizing means, automatic control means for said energizing means and means responsive to the aircraft speed and operative on said automatic control means, said automatic control means acting under the action of said speed responsive means to make said energizing means operative to bring said flap from its taking off position into its normal flight position on the aircraft speed exceeding a predetermined value and said automatic control means also including means presetting said energizing means for being made operative by said hand actuated control means to bring said flap from its normal flight position into its landing position on the aircraft speed slowing under a predetermined value.

2. An arrangement for automatic control of a wing flap of an aircraft wing comprising a reversible electromotor for actuating said flap to bring it in either taking off position, normal flight position or landing position selectively from another of said positions, means connected with said electromotor to feed it with electric current for its operation in reverse directions, a relay controlling the connection of said feeding means with said electromotor for the operation thereof in one direction to bring said flap into its normal flight position, a second relay controlling the connection of said feeding means with said electromotor for the operation thereof in the other direction to bring said flap into its landing position, energizing circuits for said first and second named relays, flap stroke end switches for said energizing circuits, a hand actuated controller for said energizing circuits, automatic control means for said energizing circuits and means responsive to the aircraft speed and operative on said automatic control means, said automatic control means closing said energizing circuit for said first named relay to bring said flap from its taking off position into its normal flight position under the action of said speed responsive means on the aircraft speed exceeding a predetermined value and said automatic control means also including means presetting said energizing circuit for said second relay for its energization by said hand actuated controller to bring said flap from its normal flight position into its landing position on the aircraft speed slowing under a predetermined value.

3. An arrangement for automatic control of a wing flap of an aircraft wing comprising means actuating said flap to bring it to either taking off position, normal flight position or landing position selectively from another of said positions, means for energizing said actuating means, hand actuated control means for said energizing means, automatic control means for said energizing means and a Pitot tube responsive to the aircraft speed and applying to said automatic control means a pressure depending on said aircraft speed, said automatic control means being operated by said pressure to make said energizing means operative to bring said flap from its taking off position into its normal flight position on said aircraft speed and pressure exceeding a predetermined value and said automatic control means also including means presetting said energizing means for being made operative by said hand actuated control means to bring said flap from its normal flight position into its landing position on said aircraft speed and pressure slowing under a predetermined value.

4. An arrangement for automatic control of a wing flap of an aircraft wing comprising means actuating said flap to bring it to either taking off position, normal flight position or landing position selectively from another of said positions, means for energizing said actuating means, hand actuated control means for said energizing means, automatic control means for said energizing means, a sealed casing in which the static air pressure is operative, a Pitot tube responsive to the aircraft speed and an expansible bellows located in said casing and fed by said Pitot tube, said automatic control means being operated by said bellows to make said energizing means operative to bring said flap from its taking off position into its normal flight position on the aircraft speed exceeding a predetermined value and said automatic control means also including means presetting said energizing means for being made operative by said hand actuated control means to bring said flap from its normal flight position into its landing position on the aircraft speed slowing under a predetermined value.

5. An arrangement for automatic control of a wing flap of an aircraft wing comprising a reversible electromotor for actuating said flap to bring it in either taking off position, normal flight position or landing position selectively from another of said positions, means connected with said electromotor to feed it with electric current for its operation in reverse directions, a relay controlling the connection of said feeding means with said electromotor for the operation thereof in one direction to bring said flap into its normal flight position, a second relay controlling the connection of said feeding means with said electromotor for the operation thereof in the other direction to bring said flap into its landing position, energizing circuits for said first and second named relays, flap stroke end switches for said energizing circuits, a hand actuated controller for said energizing circuits, a two position switch controlling said energizing circuits, a sealed casing in which the static air pressure is operative, a Pitot tube responsive to the aircraft speed and an expansible bellows located in said casing and fed by said Pitot tube with a pressure depending on the aircraft speed, said expansible bellows actuating said two position switch to close said energizing circuit for said first named relay to bring said flap from its taking off position into its normal flight position on the aircraft speed exceeding a predetermined value and to preset said energizing circuit for said second relay for its energization by said hand actuated controller to bring said flap from its normal flight position into its landing position on the aircraft speed slowing under a predetermined value.

CARLO GLIUBICH.